(12) United States Patent
Cairns et al.

(10) Patent No.: US 10,900,657 B2
(45) Date of Patent: Jan. 26, 2021

(54) EDGE-LIT LIGHT FIXTURE HAVING CAPABILITIES FOR A SECONDARY SERVICE

(71) Applicant: TECHNICAL CONSUMER PRODUCTS, INC., Aurora, OH (US)

(72) Inventors: Dustin Cairns, Rootstown, OH (US); Paul Phillips, Aurora, OH (US); Jimmy Zheng, Aurora, OH (US); George J. Uhler, Wadsworth, OH (US); Melvin Cosby, Grand River, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 16/992,585

(22) Filed: Aug. 13, 2020

(65) Prior Publication Data
US 2020/0370745 A1 Nov. 26, 2020

Related U.S. Application Data

(63) Continuation of application No. 16/052,078, filed on Aug. 1, 2018, now abandoned.
(Continued)

(51) Int. Cl.
*F21K 9/61* (2016.01)
*F21V 33/00* (2006.01)
(Continued)

(52) U.S. Cl.
CPC ............ *F21V 33/0056* (2013.01); *F21K 9/61* (2016.08); *F21S 8/026* (2013.01); *G02B 6/0085* (2013.01);
(Continued)

(58) Field of Classification Search
CPC .............. H04R 1/028; H04R 2201/021; H04R 2420/07; H05B 45/00; F21K 9/61;
(Continued)

(56) References Cited

U.S. PATENT DOCUMENTS 5,613,751 A 3/1997 Parker et al.
5,980,057 A 11/1999 Christie
(Continued)

FOREIGN PATENT DOCUMENTS

CN 101243286 A 8/2008
CN 201141556 Y 10/2008
(Continued)

OTHER PUBLICATIONS

U.S. Patent and Trademark Office, Non-Final Office Action issued for U.S. Appl. No. 16/052,078, 10 pages (dated Oct. 3, 2019).
(Continued)

*Primary Examiner* — Arman B Fallahkhair
(74) *Attorney, Agent, or Firm* — Thompson Hine LLP (57) ABSTRACT

A light fixture is disclosed, and includes a light emitting diode (LED) engine including plurality of LEDs that transmit visible light. The light fixture also includes a waveguide, where the LEDs of the LED engine surround the waveguide and transmit the visible light in a direction towards the waveguide. The light fixture also includes a second element that provides a secondary service. The light fixture also includes a housing that defines a cavity, where the LED engine and waveguide are positioned within the cavity proximate the front of the light fixture, and the a secondary element is positioned within the cavity toward the rear of the light fixture.

14 Claims, 4 Drawing Sheets

Related U.S. Application Data (60) Provisional application No. 62/539,752, filed on Aug. 1, 2017.

(51) Int. Cl.
*H04R 1/02* (2006.01)
*F21V 8/00* (2006.01)
*F21S 8/02* (2006.01)
*H05B 45/00* (2020.01)
*F21Y 115/10* (2016.01)

(52) U.S. Cl.
CPC ............ *H04R 1/028* (2013.01); *H05B 45/00* (2020.01); *F21Y 2115/10* (2016.08); *G02B 6/0036* (2013.01); *G02B 6/0088* (2013.01); *H04R 2201/021* (2013.01); *H04R 2420/07* (2013.01)

(58) Field of Classification Search
CPC .... F21S 8/026; F21V 33/0056; G02B 6/0088; G02B 6/0036; G02B 6/0085
See application file for complete search history.

(56) References Cited

U.S. PATENT DOCUMENTS

| | | |
|---|---|---|
| 6,079,838 A | 6/2000 | Parker et al. |
| 6,164,789 A | 12/2000 | Unger et al. |
| 6,530,164 B2 | 3/2003 | Gai |
| 6,712,481 B2 | 3/2004 | Parker et al. |
| 6,752,505 B2 | 6/2004 | Parker et al. |
| 6,880,963 B2 | 4/2005 | Luig et al. |
| 7,084,935 B2 | 8/2006 | Mandler et al. |
| 7,090,389 B2 | 8/2006 | Parker et al. |
| 7,364,342 B2 | 4/2008 | Parker et al. |
| 7,404,661 B2 | 7/2008 | Parker et al. |
| 7,434,973 B2 | 10/2008 | Parker et al. |
| 7,448,775 B2 | 11/2008 | Parker et al. |
| 7,467,887 B2 | 12/2008 | Parker |
| 7,494,246 B2 | 2/2009 | Harbers et al. |
| 7,537,370 B2 | 5/2009 | Parker |
| 7,677,782 B2 | 3/2010 | Lin et al. |
| 7,703,967 B2 | 4/2010 | Parker |
| 7,780,329 B2 | 8/2010 | McCollum et al. |
| 7,798,695 B2 | 9/2010 | Parker |
| 7,806,539 B2 | 10/2010 | Parker et al. |
| 7,810,982 B2 | 10/2010 | Parker et al. |
| 7,819,558 B2 | 10/2010 | Parker et al. |
| 7,826,703 B2 | 11/2010 | Iwasaki |
| 7,828,456 B2 | 11/2010 | Boyer et al. |
| 7,875,218 B2 | 1/2011 | Parker et al. |
| 7,887,227 B2 | 2/2011 | Parker et al. |
| 7,914,196 B2 | 3/2011 | Parker et al. |
| 7,963,687 B2 | 6/2011 | Parker et al. |
| 8,002,428 B2 | 8/2011 | Boyer et al. |
| 8,092,065 B2 | 1/2012 | Yeh et al. |
| 8,092,068 B2 | 1/2012 | Parker et al. |
| 8,177,386 B2 | 5/2012 | Boyer et al. |
| 8,292,448 B2 | 10/2012 | Kim et al. |
| 8,292,486 B2 | 10/2012 | Wang et al. |
| 8,322,905 B2 | 12/2012 | Parker et al. |
| 8,348,489 B2 | 1/2013 | Holman et al. |
| 8,414,162 B2 | 4/2013 | Pijlman et al. |
| 8,414,175 B2 | 4/2013 | Lin et al. |
| 8,434,893 B2 | 5/2013 | Boyer et al. |
| 8,469,572 B2 | 6/2013 | Paulus et al. |
| 8,523,388 B2 | 9/2013 | Wu |
| 8,567,983 B2 | 10/2013 | Boyer et al. |
| 8,632,211 B2 | 1/2014 | Cho |
| 8,646,933 B2 | 2/2014 | Kim et al. |
| 8,714,803 B2 | 5/2014 | Park |
| 8,721,149 B2 | 5/2014 | Holman et al. |
| 8,733,970 B2 | 5/2014 | Kim et al. |
| 8,740,439 B2 | 6/2014 | Holman et al. |
| 8,764,216 B2 | 7/2014 | Caferro et al. |
| 8,764,266 B2 | 7/2014 | Urtiga et al. |
| 8,827,525 B2 | 9/2014 | Kim et al. |
| 8,845,174 B2 | 9/2014 | Jackson et al. |
| 8,858,060 B2 | 10/2014 | Inagaki et al. |
| 8,894,232 B2 | 11/2014 | Caferro et al. |
| 8,915,634 B2 | 12/2014 | Hsu et al. |
| 8,915,636 B2 | 12/2014 | Araki et al. |
| 8,950,921 B2 | 2/2015 | Sheng |
| 8,992,065 B2 | 3/2015 | Oh |
| 9,062,836 B2 | 6/2015 | Tran et al. |
| 9,069,106 B1 | 6/2015 | Blessitt et al. |
| 9,140,436 B2 | 9/2015 | Lu et al. |
| 9,188,733 B2 | 11/2015 | Hofman |
| 9,194,550 B2 | 11/2015 | Boyer et al. |
| 9,234,994 B2 | 1/2016 | Sheng |
| 9,244,212 B2 | 1/2016 | Holman et al. |
| 9,297,506 B2 | 3/2016 | Magnan et al. |
| 9,316,380 B2 | 4/2016 | Noh et al. |
| 9,335,036 B2 | 5/2016 | Myers et al. |
| 9,372,300 B2 | 6/2016 | Ohkawa |
| 9,395,068 B2 | 7/2016 | Song et al. |
| 9,395,479 B2 | 7/2016 | Holman et al. |
| 9,423,113 B2 | 8/2016 | Myers et al. |
| 9,435,931 B2 | 9/2016 | Tanuma |
| 9,435,938 B2 | 9/2016 | Yamashita et al. |
| 9,441,801 B1 | 9/2016 | Myers et al. |
| 9,447,954 B2 | 9/2016 | Myers et al. |
| 9,453,616 B2 | 9/2016 | Myers et al. |
| 9,470,835 B2 | 10/2016 | Sheng |
| 9,523,487 B1 | 12/2016 | Myers et al. |
| 9,546,761 B2 | 1/2017 | Kim et al. |
| 9,562,678 B2 | 2/2017 | Myers et al. |
| 9,618,687 B2 | 4/2017 | Ohkawa |
| 9,651,243 B1 | 5/2017 | Springer |
| 9,664,365 B2 | 5/2017 | Myers et al. |
| 9,739,932 B2 | 8/2017 | Kuromizu et al. |
| 9,752,737 B2 | 9/2017 | Skergeth et al. |
| 9,804,320 B2 | 10/2017 | Okano et al. |
| 9,976,732 B2 | 5/2018 | Myers et al. |
| 2002/0007576 A1 | 1/2002 | Gai |
| 2003/0043595 A1 | 3/2003 | Luig et al. |
| 2004/0041521 A1 | 3/2004 | Mandler et al. |
| 2006/0239001 A1 | 10/2006 | Mandler et al. |
| 2006/0256577 A1 | 11/2006 | Parker et al. |
| 2006/0262557 A1 | 11/2006 | Parker et al. |
| 2006/0262567 A1 | 11/2006 | Parker |
| 2006/0268545 A1 | 11/2006 | McCollum et al. |
| 2006/0274554 A1 | 12/2006 | Parker |
| 2006/0274555 A1 | 12/2006 | Parker |
| 2007/0103933 A1 | 5/2007 | Parker |
| 2007/0133224 A1 | 6/2007 | Parker et al. |
| 2007/0147087 A1 | 6/2007 | Parker et al. |
| 2007/0153549 A1 | 7/2007 | Parker |
| 2007/0187852 A1 | 8/2007 | Parker et al. |
| 2008/0101094 A1 | 5/2008 | Spada et al. |
| 2008/0232093 A1 | 9/2008 | Kim |
| 2008/0239753 A1 | 10/2008 | Parker et al. |
| 2008/0239755 A1 | 10/2008 | Parker et al. |
| 2008/0298045 A1 | 12/2008 | Wright |
| 2008/0304250 A1 | 12/2008 | Harbers et al. |
| 2008/0304283 A1 | 12/2008 | Parker et al. |
| 2009/0010022 A1 | 1/2009 | Tsai |
| 2009/0027918 A1 | 1/2009 | Parker et al. |
| 2009/0027920 A1 | 1/2009 | Parker |
| 2009/0034234 A1 | 2/2009 | Parker |
| 2009/0034293 A1 | 2/2009 | Parker |
| 2009/0073719 A1 | 3/2009 | Parker |
| 2009/0092366 A1 | 4/2009 | Iwasaki |
| 2009/0103288 A1 | 4/2009 | Boyer et al. |
| 2009/0135626 A1 | 5/2009 | Parker et al. |
| 2009/0141517 A1 | 6/2009 | Parker |
| 2009/0161385 A1 | 6/2009 | Parker et al. |
| 2009/0185372 A1 | 7/2009 | Lin et al. |
| 2009/0207632 A1 | 8/2009 | McCollum et al. |
| 2009/0257244 A1 | 10/2009 | Parker |
| 2009/0290218 A1 | 11/2009 | Parker et al. |
| 2010/0046219 A1 | 2/2010 | Pijlman et al. |
| 2010/0060172 A1 | 3/2010 | Ikebe et al. |
| 2010/0079983 A1 | 4/2010 | Kumamoto |

(56) References Cited

U.S. PATENT DOCUMENTS

| | | |
|---|---|---|
| 2010/0085774 A1 | 4/2010 | Park |
| 2010/0110724 A1 | 5/2010 | Moncrieff |
| 2010/0118545 A1 | 5/2010 | Ijzerman et al. |
| 2010/0165662 A1 | 7/2010 | Hamada |
| 2010/0172151 A1 | 7/2010 | Parker |
| 2010/0176411 A1 | 7/2010 | Suzuki |
| 2010/0237359 A1 | 9/2010 | Cornelissen et al. |
| 2010/0290251 A1 | 11/2010 | Wang et al. |
| 2010/0302804 A1 | 12/2010 | Inagaki et al. |
| 2010/0315833 A1 | 12/2010 | Holman et al. |
| 2011/0019436 A1 | 1/2011 | Van Den et al. |
| 2011/0025229 A1 | 2/2011 | Yeh et al. |
| 2011/0051457 A1 | 3/2011 | Chen |
| 2011/0085328 A1 | 4/2011 | Boyer et al. |
| 2011/0176329 A1 | 7/2011 | Lin et al. |
| 2011/0205145 A1 | 8/2011 | Lin et al. |
| 2011/0222293 A1 | 9/2011 | Kim et al. |
| 2011/0228531 A1 | 9/2011 | Boyer et al. |
| 2011/0317846 A1 | 12/2011 | Yuan et al. |
| 2012/0075882 A1 | 3/2012 | Tsang et al. |
| 2012/0075887 A1 | 3/2012 | Parker et al. |
| 2012/0106147 A1 | 5/2012 | Kim et al. |
| 2012/0182733 A1 | 7/2012 | Cho |
| 2012/0201047 A1 | 8/2012 | Paulus et al. |
| 2012/0212958 A1 | 8/2012 | Boyer et al. |
| 2012/0224391 A1 | 9/2012 | Kim et al. |
| 2012/0250296 A1 | 10/2012 | Lu et al. |
| 2012/0287631 A1 | 11/2012 | Sheng |
| 2012/0294009 A1 | 11/2012 | Ijzerman et al. |
| 2012/0294016 A1 | 11/2012 | Tran et al. |
| 2012/0294037 A1 | 11/2012 | Holman et al. |
| 2012/0300437 A1 | 11/2012 | Lu et al. |
| 2012/0320627 A1 | 12/2012 | Araki et al. |
| 2013/0010467 A1 | 1/2013 | Kim et al. |
| 2013/0027915 A1 | 1/2013 | Caferro et al. |
| 2013/0044512 A1 | 2/2013 | Araki et al. |
| 2013/0051068 A1 | 2/2013 | Jackson et al. |
| 2013/0058080 A1 | 3/2013 | Ge et al. |
| 2013/0070455 A1 | 3/2013 | Tsui et al. |
| 2013/0083559 A1 | 4/2013 | Oh |
| 2013/0107572 A1 | 5/2013 | Holman et al. |
| 2013/0128610 A1 | 5/2013 | Hsu et al. |
| 2013/0182430 A1 | 7/2013 | Wu |
| 2013/0182431 A1 | 7/2013 | Wu |
| 2013/0194800 A1 | 8/2013 | Boyer et al. |
| 2013/0223100 A1 | 8/2013 | Caferro et al. |
| 2013/0258706 A1 | 10/2013 | Urtiga et al. |
| 2014/0022815 A1 | 1/2014 | Tanuma |
| 2014/0029257 A1 | 1/2014 | Boyer et al. |
| 2014/0098564 A1 | 4/2014 | Magnan et al. |
| 2014/0218968 A1 | 8/2014 | Sun et al. |
| 2014/0268873 A1 | 9/2014 | Holman et al. |
| 2014/0313774 A1 | 10/2014 | Myers et al. |
| 2014/0313775 A1 | 10/2014 | Myers et al. |
| 2014/0313780 A1 | 10/2014 | Myers |
| 2014/0340932 A1 | 11/2014 | Kim et al. |
| 2014/0362579 A1 | 12/2014 | Noh et al. |
| 2014/0362602 A1 | 12/2014 | Hofman |
| 2014/0376266 A1 | 12/2014 | Myers et al. |
| 2014/0376267 A1 | 12/2014 | Myers et al. |
| 2015/0009669 A1 | 1/2015 | Gervais et al. |
| 2015/0016141 A1 | 1/2015 | Santoro et al. |
| 2015/0029592 A1 | 1/2015 | Long et al. |
| 2015/0036386 A1 | 2/2015 | Holman et al. |
| 2015/0036387 A1 | 2/2015 | Myers |
| 2015/0049512 A1 | 2/2015 | Myers et al. |
| 2015/0085528 A1 | 3/2015 | Myers et al. |
| 2015/0103558 A1 | 4/2015 | Fobbe |
| 2015/0124478 A1 | 5/2015 | Ohkawa |
| 2015/0138831 A1 | 5/2015 | Okano et al. |
| 2015/0153031 A1 | 6/2015 | Myers et al. |
| 2015/0153501 A1 | 6/2015 | Sheng |
| 2015/0168635 A1 | 6/2015 | Holman et al. |
| 2015/0168636 A1 | 6/2015 | Holman et al. |
| 2015/0226911 A1 | 8/2015 | Yamashita et al. |
| 2015/0277018 A1 | 10/2015 | Sahlhoff |
| 2015/0309248 A1 | 10/2015 | Xu |
| 2015/0330610 A1 | 11/2015 | Song et al. |
| 2016/0004008 A1 | 1/2016 | Phua |
| 2016/0010846 A1 | 1/2016 | Wu |
| 2016/0018063 A1 | 1/2016 | Skergeth et al. |
| 2016/0033717 A1 | 2/2016 | Hofman |
| 2016/0070049 A1 | 3/2016 | Miyashita |
| 2016/0124137 A1 | 5/2016 | Sheng |
| 2016/0163663 A1 | 6/2016 | Kim et al. |
| 2016/0215932 A1 | 7/2016 | Myers et al. |
| 2016/0216429 A1 | 7/2016 | Brand et al. |
| 2016/0231500 A1 | 8/2016 | Kuromizu et al. |
| 2016/0265731 A1 | 9/2016 | Myers et al. |
| 2016/0266303 A1 | 9/2016 | Ohkawa |
| 2016/0320038 A1 | 11/2016 | Myers et al. |
| 2016/0356467 A1 | 12/2016 | Myers et al. |
| 2017/0097147 A1 | 4/2017 | Myers et al. |
| 2017/0167694 A1 | 6/2017 | Sheng |
| 2017/0211750 A1 | 7/2017 | Yotsumoto |
| 2017/0261189 A1 | 9/2017 | Myers et al. |
| 2018/0249234 A1 | 8/2018 | Zhuang |
| 2018/0266668 A1 | 9/2018 | Myers et al. |
| 2018/0352313 A1 | 12/2018 | Hsu |
| 2019/0110115 A1 | 4/2019 | Yokosawa |

FOREIGN PATENT DOCUMENTS

| | | |
|---|---|---|
| CN | 201246690 Y | 5/2009 |
| CN | 201281238 Y | 7/2009 |
| CN | 201326928 Y | 10/2009 |
| CN | 201339877 Y | 11/2009 |
| CN | 101608787 A | 12/2009 |
| CN | 101629686 A | 1/2010 |
| CN | 100590349 C | 2/2010 |
| CN | 201425177 Y | 3/2010 |
| CN | 201462528 U | 5/2010 |
| CN | 201487606 U | 5/2010 |
| CN | 201487704 U | 5/2010 |
| CN | 101737647 A | 6/2010 |
| CN | 101749554 A | 6/2010 |
| CN | 201502122 U | 6/2010 |
| CN | 201513769 U | 6/2010 |
| CN | 201582616 U | 9/2010 |
| CN | 201651956 U | 11/2010 |
| CN | 201706267 U | 1/2011 |
| CN | 2017062266 U | 1/2011 |
| CN | 101988652 A | 3/2011 |
| CN | 201775361 U | 3/2011 |
| CN | 201795371 U | 4/2011 |
| CN | 201803316 U | 4/2011 |
| CN | 201819106 U | 5/2011 |
| CN | 102121585 A | 7/2011 |
| CN | 201897094 U | 7/2011 |
| CN | 201897097 U | 7/2011 |
| CN | 201902868 U | 7/2011 |
| CN | 102168822 A | 8/2011 |
| CN | 201934990 U | 8/2011 |
| CN | 201954416 U | 8/2011 |
| CN | 102203500 A | 9/2011 |
| CN | 201973491 U | 9/2011 |
| CN | 102213387 A | 10/2011 |
| CN | 202040632 U | 11/2011 |
| CN | 202056757 U | 11/2011 |
| CN | 202082666 U | 12/2011 |
| CN | 102454925 A | 5/2012 |
| CN | 202253056 U | 5/2012 |
| CN | 202256753 U | 5/2012 |
| CN | 202266945 U | 6/2012 |
| CN | 202274312 U | 6/2012 |
| CN | 102588795 A | 7/2012 |
| CN | 102588802 A | 7/2012 |
| CN | 102588803 A | 7/2012 |
| CN | 102606901 A | 7/2012 |
| CN | 102606926 A | 7/2012 |
| CN | 102606951 A | 7/2012 |
| CN | 102620166 A | 8/2012 |
| CN | 102635798 A | 8/2012 |
| CN | 102690196 A | 8/2012 |

(56) References Cited

FOREIGN PATENT DOCUMENTS

| | | | |
|---|---|---|---|
| CN | 202392534 U | 8/2012 |
| CN | 102679247 A | 9/2012 |
| CN | 102679271 A | 9/2012 |
| CN | 102691918 A | 9/2012 |
| CN | 102691919 A | 9/2012 |
| CN | 102707369 A | 10/2012 |
| CN | 102720987 A | 10/2012 |
| CN | 202493941 U | 10/2012 |
| CN | 202493942 U | 10/2012 |
| CN | 202494793 U | 10/2012 |
| CN | 202521325 U | 11/2012 |
| CN | 102834663 A | 12/2012 |
| CN | 202613324 U | 12/2012 |
| CN | 102865483 A | 1/2013 |
| CN | 102901008 A | 1/2013 |
| CN | 202649505 U | 1/2013 |
| CN | 202674967 U | 1/2013 |
| CN | 202691669 U | 1/2013 |
| CN | 202691830 U | 1/2013 |
| CN | 202812937 U | 3/2013 |
| CN | 103032703 A | 4/2013 |
| CN | 103090280 A | 5/2013 |
| CN | 202916457 U | 5/2013 |
| CN | 103148370 A | 6/2013 |
| CN | 203010375 U | 6/2013 |
| CN | 103293591 A | 9/2013 |
| CN | 103335241 A | 10/2013 |
| CN | 203287556 U | 11/2013 |
| CN | 203385887 U | 1/2014 |
| CN | 203395667 U | 1/2014 |
| CN | 103620811 A | 3/2014 |
| CN | 203464173 U | 3/2014 |
| CN | 203478048 U | 3/2014 |
| CN | 203533365 U | 4/2014 |
| CN | 203615093 U | 5/2014 |
| CN | 203671348 U | 6/2014 |
| CN | 203836669 U | 9/2014 |
| CN | 203868765 U | 10/2014 |
| CN | 203907373 U | 10/2014 |
| CN | 203963703 U | 11/2014 |
| CN | 203963820 U | 11/2014 |
| CN | 104280813 A | 1/2015 |
| CN | 104613377 A | 5/2015 |
| CN | 204345429 U | 5/2015 |
| CN | 104714268 A | 6/2015 |
| CN | 204403945 U | 6/2015 |
| CN | 204405889 U | 6/2015 |
| CN | 204460090 U | 7/2015 |
| CN | 204573919 U | 8/2015 |
| CN | 204693100 U | 10/2015 |
| CN | 204829399 U | 12/2015 |
| CN | 204943113 U | 1/2016 |
| CN | 204986461 U | 1/2016 |
| CN | 204986550 U | 1/2016 |
| CN | 204986694 U | 1/2016 |
| CN | 205026507 U | 2/2016 |
| CN | 205067783 U | 3/2016 |
| CN | 205388264 U | 7/2016 |
| CN | 105909989 A | 8/2016 |
| CN | 205484896 U | 8/2016 |
| CN | 207094410 U | 3/2018 |
| WO | 2013/009086 A2 | 1/2013 |

OTHER PUBLICATIONS

U.S. Patent and Trademark Office, Notice of Allowance issued for U.S. Appl. No. 16/052,078, 10 pages (dated May 13, 2020).
PCT, U.S. Patent and Trademark Office (ISA/US), International Search Report and Written Opinion of the International Searching Authority, International Application No. PCT/US2018/044810, 11 pages, dated Oct. 4, 2018.
GE Lighting Asia Pacific, web page featuring "LED Edgelit Luminaires," first publication at least as early as Aug. 2013 (retrieved from the internet on Jan. 16, 2019) https://web.archive.org/web/20130810153425/https://www.gelighting.com/Lightingweb/apac/products/luminaires/edgelit/overview/.

EDGE-LIT LIGHT FIXTURE HAVING CAPABILITIES FOR A SECONDARY SERVICE

CROSS-REFERENCE TO RELATED APPLICATIONS

This application is a continuation of U.S. patent application Ser. No. 16/052,078 filed Aug. 1, 2018, which claims the benefit of U.S. Provisional Patent Application No. 62/539,752 filed Aug. 1, 2017, each of which is incorporated herein by reference in its entirety.

TECHNICAL FIELD

The present disclosure relates generally to a light fixture, and more particularly to a light fixture that includes a light producing element and at least one other element that provides a secondary service that are both contained within a housing of the light fixture.

BACKGROUND

Light emitting diode (LED) based lighting systems may offer several energy and reliability advantages over other types of lighting systems such as, for example, incandescent or fluorescent lighting. Thus, LED based lighting systems are increasingly being used to replace other existing lighting technologies. Moreover, it should also be appreciated that LED based lighting systems also being used as components of other systems such as home automation systems.

Automation systems are used to control various systems that are typically found in homes and office buildings such as lights, heating, security systems, and home appliances. Some examples of appliances that may be controlled by an automation system include washers, dryers, ovens, and refrigerators. Some types of automation systems may also integrate various features and functions into a single device. In fact, sometimes light fixtures include a light producing element like a LED light engine as well as another element that provides another function. For example, the light fixture may include a speaker that produces sound or a microphone that detects a user's voice or other sounds.

Sometimes difficulties are encountered when attempting to package multiple components that each provide different functions into a single light fixture. This is because light fixtures are usually of a standard size and shape, and therefore only have a limited amount of space available for accommodating various components. Furthermore, sometimes the additional components may interfere with the light fixture's ability to radiate light in a manner that is not only effective, but also aesthetically pleasing. There are also challenges with providing other functions within the light fixture. For example, the sound quality or level of a speaker may be compromised in order to fulfill the light fixture's lumen requirements.

DETAILED DESCRIPTION

The following detailed description will illustrate the general principles of the invention, examples of which are additionally illustrated in the accompanying drawings. In the drawings, like reference numbers indicate identical or functionally similar elements.

Figure 1:
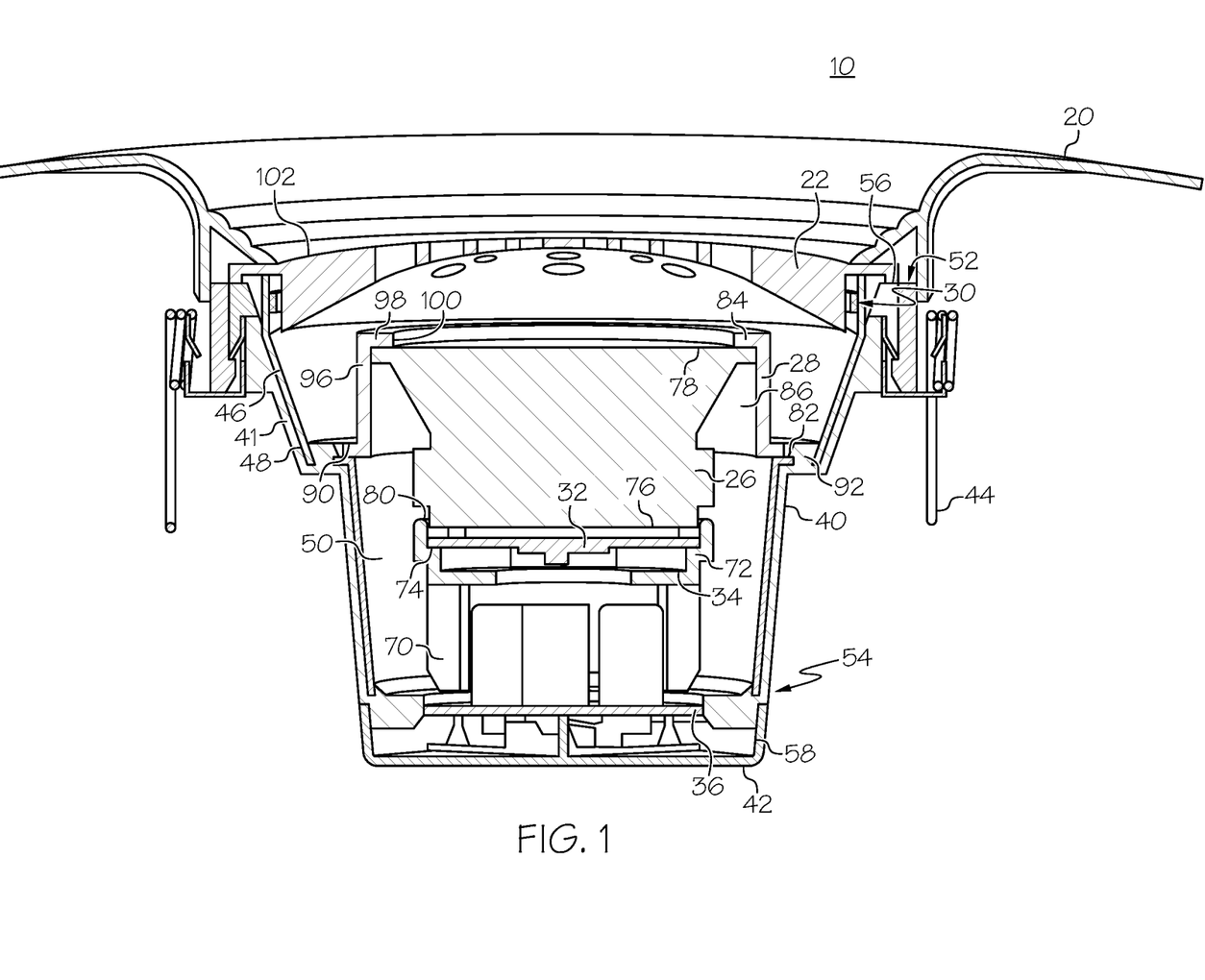
FIG. 1 is a perspective, cross-sectioned view of the disclosed light fixture.

FIG. 1 is a perspective, cross-sectioned view of an exemplary light fixture 10. The light fixture 10 includes a bezel 20, a waveguide 22, a secondary element 26, a secondary element holder 28, a light emitting diode (LED) engine 30, a first driver board 32, a driver board holder 34, a second driver board 36, a housing 40, an end cap or cover 42, and one or more installation features 44 such as installation springs. Although the light fixture 10 shown in FIG. 1 illustrates a downlight, it is to be appreciated that the embodiment in FIG. 1 is merely exemplary in nature. For example, in other embodiments the light fixture 10 may be a parabolic aluminized reflector (PAR) type light fixture or a bulged reflector (BR) type light fixture.

In addition to generating light, the light fixture 10 also includes the secondary element 26, which is used to provide another, secondary service in addition to generating light. In the non-limiting embodiment as described, the secondary element 26 is a speaker for generating sound. However, it is to be understood that the light fixture 10 is not limited to a speaker. For example, in other embodiments the secondary element 26 may be a microphone or a motion detector.

The housing 40 defines a cavity 50 that is shaped to contain the secondary element 26, the secondary element holder 28, the LED engine 30, the first driver board 32, the driver board holder 34, and the second driver board 36. In the non-limiting embodiment as shown in FIG. 1, the housing 40 includes a heat sink 46 that is constructed of a heat-conducting metal. The heat sink 46 coincides with an inner surface 48 of the housing 40. In another embodiment, the housing 40 is constructed of a material that is an electrical insulator that allows for radio frequency (RF) signals to pass through such as, but not limited to, a thermally conductive plastic. The housing 40 defines a first end portion 52 and a second end portion 54. The first end portion 52 of the housing 40 defines a first opening 56 and the second end portion 54 defines a second opening 58 of the housing 40. As seen in FIG. 1, a portion 41 of the housing 40 may have a generally frustoconical profile, and the first opening 56 of the housing 40 is larger in size when compared to the second opening 58.

In the non-limiting embodiment as shown, the first end portion 52 of the housing 40 is secured to the bezel 20, and the second end portion 54 of the housing 40 is secured to the cover 42. The bezel 20 may be secured to the first end portion 52 of the housing 40 by a snap-fit engagement. However, it is to be appreciated that the bezel 20 and the housing 40 are not limited to a snap-fit engagement, and that other fastening techniques may be used as well to secure the bezel 20 to the housing 40. Furthermore, in an alternative embodiment, the bezel 20 and the housing 40 may be integrated together into a single piece. The cover 42 may be used to close off or seal the second opening 58 of the housing 40.

Figure 2:
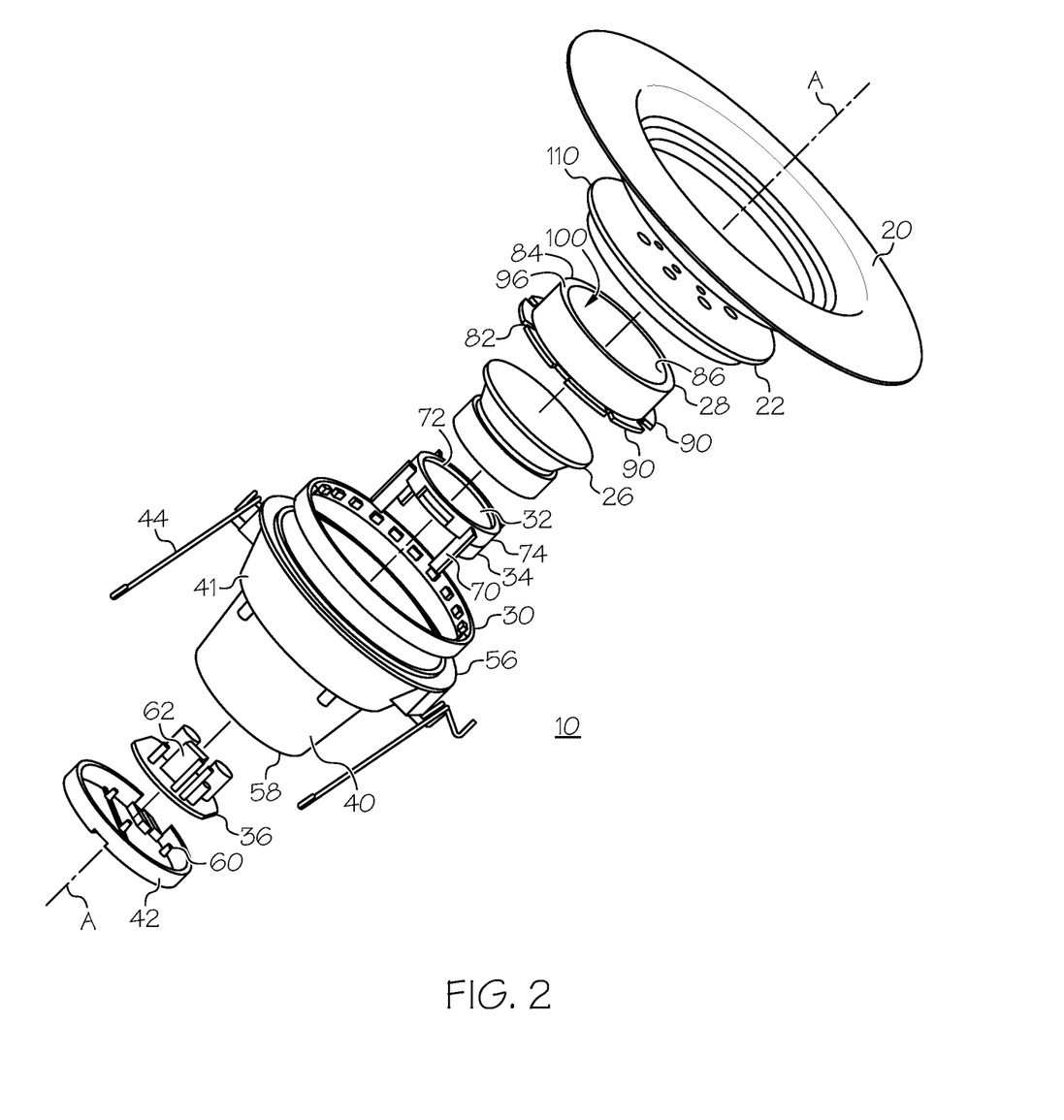
FIG. 2 is an exploded view of the light fixture shown in FIG. 1.

FIG. 2 is an exploded view of the light fixture 10 shown in FIG. 1. Referring now to both FIGS. 1 and 2, the cover 42 may include one or more locating features 60 for engaging and locating the second driver board 36. The second driver board 36 may include various power electronics 62 required for electrical operation of the LED engine 30 and the light fixture 10. The driver board holder 34 may include one or more legs 70 that project in a direction towards the second end portion 54 and cover 42 of the light fixture 10 when assembled. The legs 70 of the driver board holder 34 may act as locator pins or features that are used to engage and secure the driver board 36 in place within the cavity 50 of the housing 40.

The driver board holder 34 may also define a ledge 72, where the ledge 72 defines a recessed surface 74 (corresponding position exterior of the holder 34 is indicated in FIG. 2) that the first driver board 32 may be seated upon. The first driver board 32 may be a printed circuit board (PCB) and may include an antenna (not shown), such as a trace antenna. However, those skilled in the art will appreciate that the disclosure should not be limited to a trace antenna and PCB. In one embodiment, the antenna may be configured to receive a short-range RF signal such as, for example, a Bluetooth® signal conforming to the Institute of Electrical and Electronics Engineers (IEEE) Standard 802.15. Furthermore, in one embodiment, the antenna may be a multi-band antenna that operates at different RF frequency bands.

Referring to FIG. 1, the secondary element 26 includes a first end portion 76 and a second end portion 78. The first end portion 76 of the secondary element 26, which is illustrated as a speaker, is seated against a front face 80 of the driver board holder 34. Referring now to both FIGS. 1 and 2, the secondary element holder 28 defines a first end portion 82, a second end portion 84, and a cavity 86 that extends in an axial direction along a central axis A-A of the light fixture 10. The first end portion 82 of the secondary element holder 28 includes one or more retaining flanges 90. As seen in FIG. 1, the flanges 90 of the secondary element holder 28 may engage the holder 28 to a retaining feature 92 located along the inner surface 48 of the housing 40.

The second end portion 84 of the holder 28 defines a flange 96 that extends in an inward direction with respect to the axis A-A of the light fixture 10. As seen in FIG. 1, the flange 96 defines an opening 100 that is smaller in size than the second end portion 78 of the secondary element 26. Thus, a rear face 98 of the flange 96 of the secondary element holder 28 retains the secondary element 26 in place within the housing 40 of the light fixture 10. For example, in the embodiment as shown the light fixture 10 is a downlight. Therefore, when the downlight is installed in a building, the end cap 42 is positioned so as to be on top or at the upper end of the light fixture 10. When the downlight is installed, the flange 96 of the secondary element holder 28 prevents the secondary element 26 from migrating downwards and contacting the waveguide 22.

Figure 3:
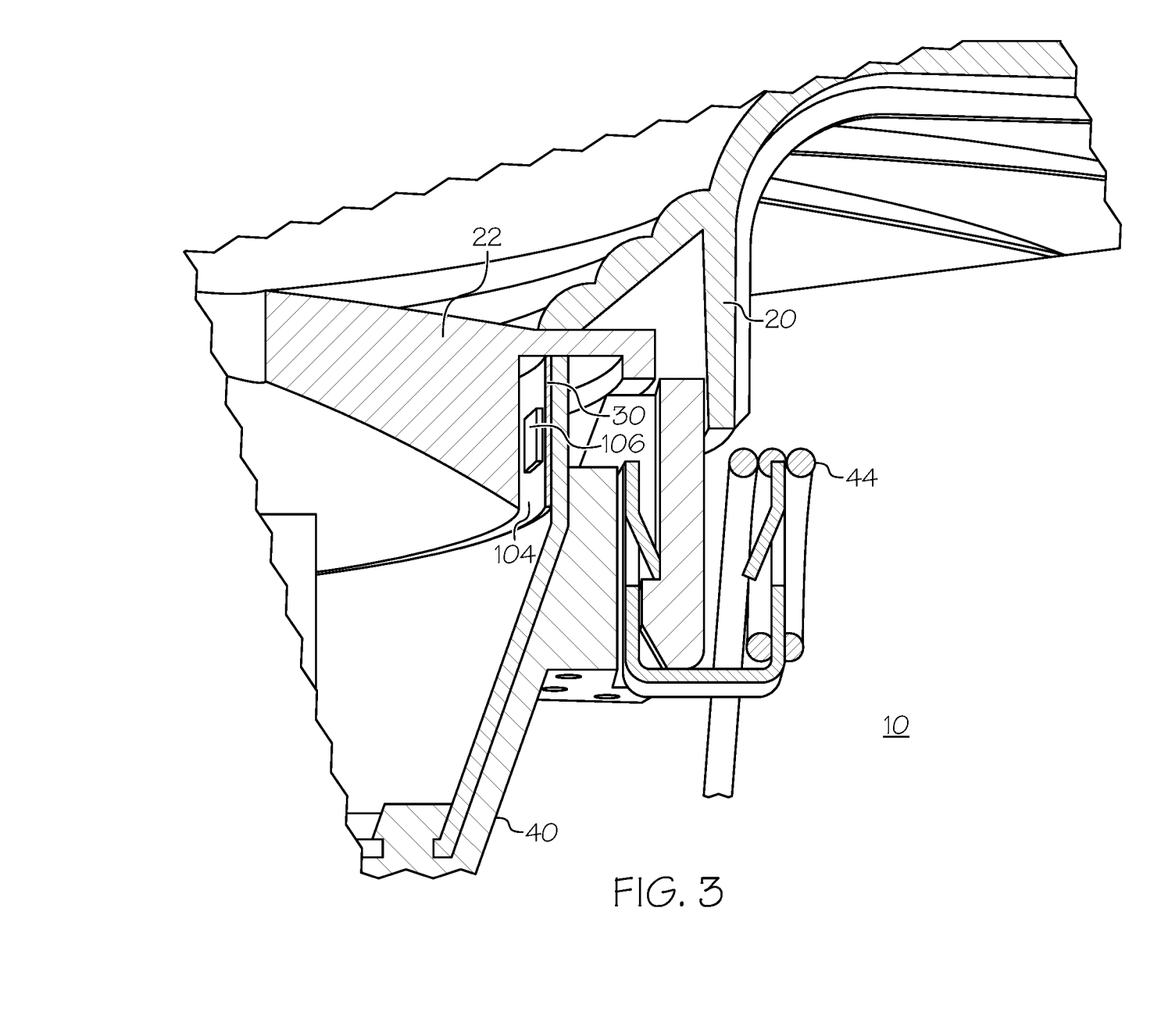
FIG. 3 is an enlarged view of a portion of the light fixture of FIG. 1.

The light fixture 10 is an edge-lit device. That is, the LED light engine 30 surrounds the waveguide 22 in the plane of the waveguide, i.e., surrounds the lateral edges of the waveguide 22 with respect to the central axis A-A of the light fixture. The waveguide 22 is constructed of the material including properties that illuminate an entire face 102 (FIGS. 1 and 4) of the waveguide 22 using the light generated by the LED engine 30. One advantage of using an edge-lit device is cost reduction, since fewer LEDs are typically required to produce the same lumen output. Referring to FIGS. 1 and 3, the LED light engine 30 includes a backing material 104 and a plurality of LEDs 106 that are mounted upon the backing material 104. The backing material 104 may be a relatively flexible material. Specifically, the backing material 104 may be formed as a strip, and the strip may be bent into the annular or ring-shaped configuration as seen in FIG. 3. Thus, the LED light engine 30 may completely extend around a circumference 110 (FIG. 2) of the waveguide 22. That is, in other words, the LEDs 106 surround the waveguide 22, and transmit visible light in a direction towards the waveguide 22.

Figure 4:
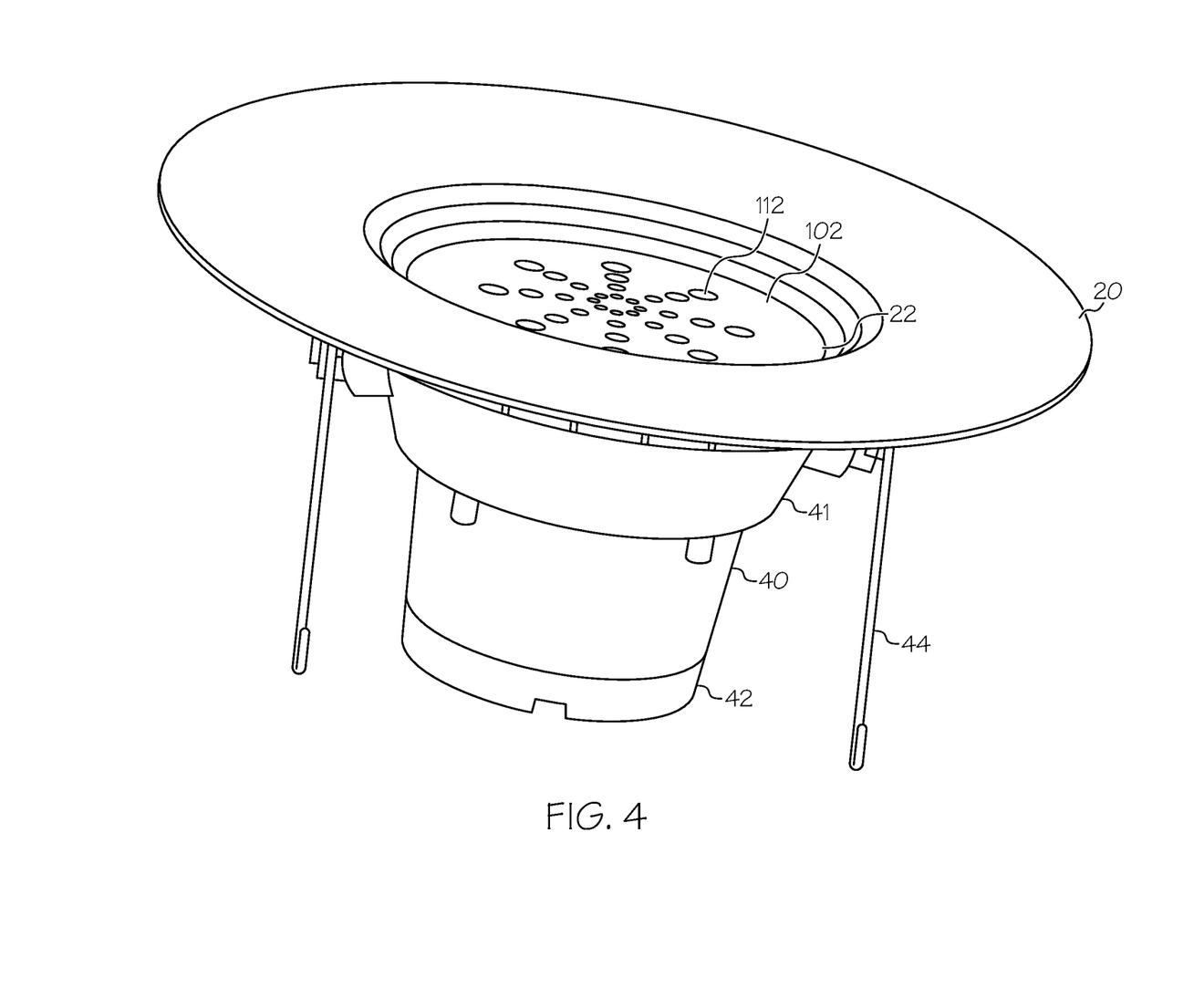
FIG. 4 is another perspective view of the disclosed light fixture.

Referring now to FIG. 4, the waveguide 22 may also be referred to as a lens or a light guide. The waveguide 22 is used to collect the light generated by the LEDs 106, and directs the light to the front face 102 of the waveguide 22 to provide illumination. The waveguide 22 may include a plurality of light deflecting elements (not illustrated), which are also referred to as microstructures or three-dimensional elements. In one embodiment, the light deflecting elements are prismatic cavities formed in a longitudinal direction of the waveguide 22, and are used to illuminate the entire front face 102 of the waveguide 22. The light deflecting elements are distributed along the front face 102 of the waveguide 22.

The waveguide 22 may define a plurality of apertures 112, which are distributed in a predefined pattern along the front face 102 of the waveguide 22. In the embodiment as shown, the apertures 112 allow sound generated by the secondary element 26 (FIGS. 1 and 2), which is illustrated as a speaker, to be transmitted to the environment. The apertures 112 may be arranged into a starburst pattern where the apertures 112 are arranged to radiate outwardly from a central point along the front face 102 of the waveguide 22. However, it is to be appreciated that the embodiment as shown in FIG. 4 is merely exemplary in nature, and that the apertures 112 may be arranged into a variety of other patterns and configurations as well.

It is to be appreciated that the apertures 112 are arranged so as to provide acceptable sound quality, and to also provide light that is not only aesthetically pleasing, but also meets any light output or lumen requirements. In other words, the apertures 112 are arranged so as to create a light pattern that may be considered visually appealing to a consumer.

Referring generally to the figures, the disclosed light assembly provides at least one other or secondary service to a consumer. For example, in the embodiments as shown, the secondary service is a speaker for transmitting sound. The LED light engine is positioned around and directs light towards the waveguide. The edge-lit LEDs require less packaging space when compared to conventional board-type LED light engines, which are usually mounted along a central portion of a light. Therefore, the edge-lit LEDs allow for sufficient packaging space for the elements associated with the secondary service. In other words, the edge-lit LED configuration results in increased packaging space to accommodate the speaker. Furthermore, the sound quality or level of a speaker is not compromised in order to fulfill the light fixture's lumen requirements.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A light fixture, comprising: a light emitting diode (LED) engine including plurality of LEDs that emit visible light; a housing that defines a cavity, wherein the LED engine is positioned within the cavity, wherein a generally planar waveguide is positioned within a first end portion of the housing comprising the front of the light fixture and is oriented such that the plane of the waveguide is parallel to the front of the light fixture, and wherein the plurality of LEDs of the LED engine surround the lateral edges of the waveguide and emit the visible light in a direction towards the waveguide; and a secondary element that provides a secondary service, wherein the secondary element is positioned within the cavity between the first end portion of the housing and a second end portion of the housing comprising the rear of the light fixture, and wherein the secondary element is disposed rearward of the waveguide, wherein the waveguide defines a plurality of apertures through a front face of the waveguide that allow sound to be transmitted from the secondary element to the environment or received by the secondary element from the environment, and wherein the waveguide directs the visible light to be emitted out from the front face of the waveguide amongst the plurality of apertures.

2. The light fixture of claim 1, wherein the light fixture further comprises:
   first and second driver boards positioned with the cavity between the second end portion and the secondary element; and
   a driver board holder interposed between the first and second driver boards and the secondary element, wherein the secondary element seats against a front face of the driver board holder; and
   a secondary element holder interposed between the secondary element and the waveguide.

3. The light fixture of claim 2, wherein the front face of the driver board holder defines a ledge, and the ledge defines a recessed surface that the first driver board is seated upon.

4. The light fixture of claim 3, wherein the driver board holder includes one or more legs that project in a direction towards the second end of the housing, and the one or more legs engage the second driver board to secure the second driver board within the cavity.

5. The light fixture of claim 4, further comprising an end cap secured to the second end portion of the housing, wherein the end cap includes a locator feature engaging the second driver board.

6. The light fixture of claim 3, wherein the first driver board includes an antenna configured to receive a short-range RF signal.

7. The light figure of claim 2, wherein the secondary element includes a first end portion, and the first end portion of the secondary element includes one or more retaining flanges that engage a retaining feature located along an inner surface of the housing.

8. The light fixture of claim 7, wherein the secondary element includes a second end portion, wherein the second end portion of the secondary element is positioned frontward of the first end portion of the secondary element and the second end portion of the secondary element includes an inwardly extending flange that defines an opening that is smaller than the second end portion of the secondary element.

9. The light fixture of claim 8, wherein the secondary element is seated between the front face of the driver board holder and a rear face of the inwardly extending flange.

10. The light fixture of claim 1, wherein the secondary element includes a speaker.

11. The light fixture of claim 1, wherein the secondary element includes a microphone.

12. The light fixture of claim 1, wherein the light fixture is a downlight.

13. The light fixture of claim 1, wherein the plurality of LEDs of the LED engine are mounted upon a backing material, and the backing material is shaped as an annular ring extending around a circumference of the waveguide.

14. The light fixture of claim 1, wherein the first end portion of the housing includes a heat sink, constructed of a heat-conducting metal, that coincides with an inner surface of the housing.

* * * * *